(12) United States Patent
Yocum

(10) Patent No.: US 6,695,100 B1
(45) Date of Patent: Feb. 24, 2004

(54) DRUM BRAKE

(75) Inventor: Matthew Philip Yocum, Mishawaka, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/249,630

(22) Filed: Apr. 25, 2003

(51) Int. Cl.$^7$ ................................................. F16D 51/00

(52) U.S. Cl. ................................................. 188/79.63

(58) Field of Search .................. 188/72.3, 73.31, 188/73.36, 73.38, 325, 79.63; 267/85, 166, 166.1, 167, 178, 179, 180, 182, DIG. 3

(56) References Cited

U.S. PATENT DOCUMENTS

| | | | | |
|---|---|---|---|---|
| 2,381,655 A | * | 8/1945 | Edmonds | 188/327 |
| 2,382,268 A | * | 8/1945 | Stelzer | 188/364 |
| 4,577,733 A | * | 3/1986 | Oguro et al. | 188/217 |
| 4,998,602 A | * | 3/1991 | Yamamoto | 188/328 |

FOREIGN PATENT DOCUMENTS

DE    2543753 A    *    4/1977    ........... F16D/65/52

* cited by examiner

*Primary Examiner*—Jack Lavinder
*Assistant Examiner*—Xuan Lan Nguyen
(74) *Attorney, Agent, or Firm*—Leo H McCormick, Jr.; Warren Comstock

(57) ABSTRACT

A drum brake assembly for a vehicle wherein first and second brake shoes are positioned on a backing plate and radially aligned with a drum by a resilient arrangement. The resilient arrangement is characterized by first and second spring each of which have a first helical coil located between a first engagement section and a second engagement section, a second helical coil that extends from a first end of the first engagement section to a second end and a third helical coil that extends from a first end of the second section to second end. The second ends of the first and second engagement sections are connected to the backing plate such that the first and second engagement sections contact the first and second shoes and the second and third helical coils urge the first and second shoes toward the backing plate while the first helical coils urges the first and second shoes toward an actuator and an adjuster to define a rest position for the first and second brake shoes.

7 Claims, 2 Drawing Sheets

DRUM BRAKE

BACKGROUND OF INVENTION

The following U.S. Pat. Nos. 3,232,391, 3,384,205, 6,328,141 and 6,394,237 illustrate typical drum brakes wherein a first brake shoe and a second brake shoe are resiliently retained on a backing plate through hold down pin arrangements. In each of these drum brakes, the hold down pin arrangements allow the first and second brake shoes to move toward a drum during a brake application while at the same time allowing return springs to move the first and second brake shoes to a position of rest on completion of a brake application. This type of drum brake is often used as a parking or emergency brake as disclosed in U.S. patent application Ser. No. 10/195,821 filed Jul. 15, 2002. When used as a parking and emergency brake, the use is limited, as it has been estimated that during the life of a vehicle less than twenty-five percent of the operators of a vehicle will use the emergency or parking brake on a regular basis. With such limited use even though this type of drum brake functions in an adequate manner there is a continual effort to simplicity the structure such as provided by the present invention.

SUMMARY OF INVENTION

A primary object of the present invention is to provide a drum brake wherein a single resilient member functions to both axially and linearly retain first and second brake shoes on a backing plate.

In more particular detail, the drum brake has first and second brake shoes that are positioned on a backing plate that is secured to the vehicle and radially aligned with a drum. The first and second brake shoes each have a first end that is aligned with an anchor post that extends from the backing plate and with an actuator member adjacent the anchor post while a second end of each of the first and second brake shoes are linked to each other by an adjuster mechanism. The first end of the first and second brake shoes is selectively spaced apart from each other by the actuator member. A resilient arrangement is connected to the first and second brake shoes for urging the first ends toward the anchor and the second ends toward the adjuster mechanism to define a rest position for the first and second brake shoes. In the rest position, there is a running clearance established between friction surfaces on the first and second brake shoes and a braking surface on the drum. An input member is connected to the actuator member for transmitting a force that moves the first and second brake shoes through the running clearance such that the friction surfaces contact the engagement surface of said drum to effect a brake application. The resilient member is characterized by first and second springs each of which have a first helical coil located between a first engagement section and a second engagement section, a second helical coil that extends from the first engagement section to a first end and a third helical coil that extends from the second engagement section to a second end. The first and second ends of each of the first and second springs are connected to the backing plate such that the first and second engagement sections respectively contact the webs of the first and second shoes and the second and third helical coils urge the first and second shoes toward the backing plate to retain the first and second shoes on the backing plate while the first helical coils urges the first and second shoes toward the actuator and the adjuster to define a rest position for the first and second brake shoes.

An advantage of this invention resides in the use of a single spring for a drum brake that both retains first and second brake shoes on a backing plate and urges the first and second brake shoes toward a position of rest in an absence of an input force being applied to effect a brake application.

A still further advantage of this invention resides in a spring having a return helical coil located between identical hold down helical coils wherein the hold down helical coils have a first spring force that is less than the return helical coil such that the spring is easier to move in a vertical direction than in a lateral direction.

DETAILED DESCRIPTION

Figure 1:
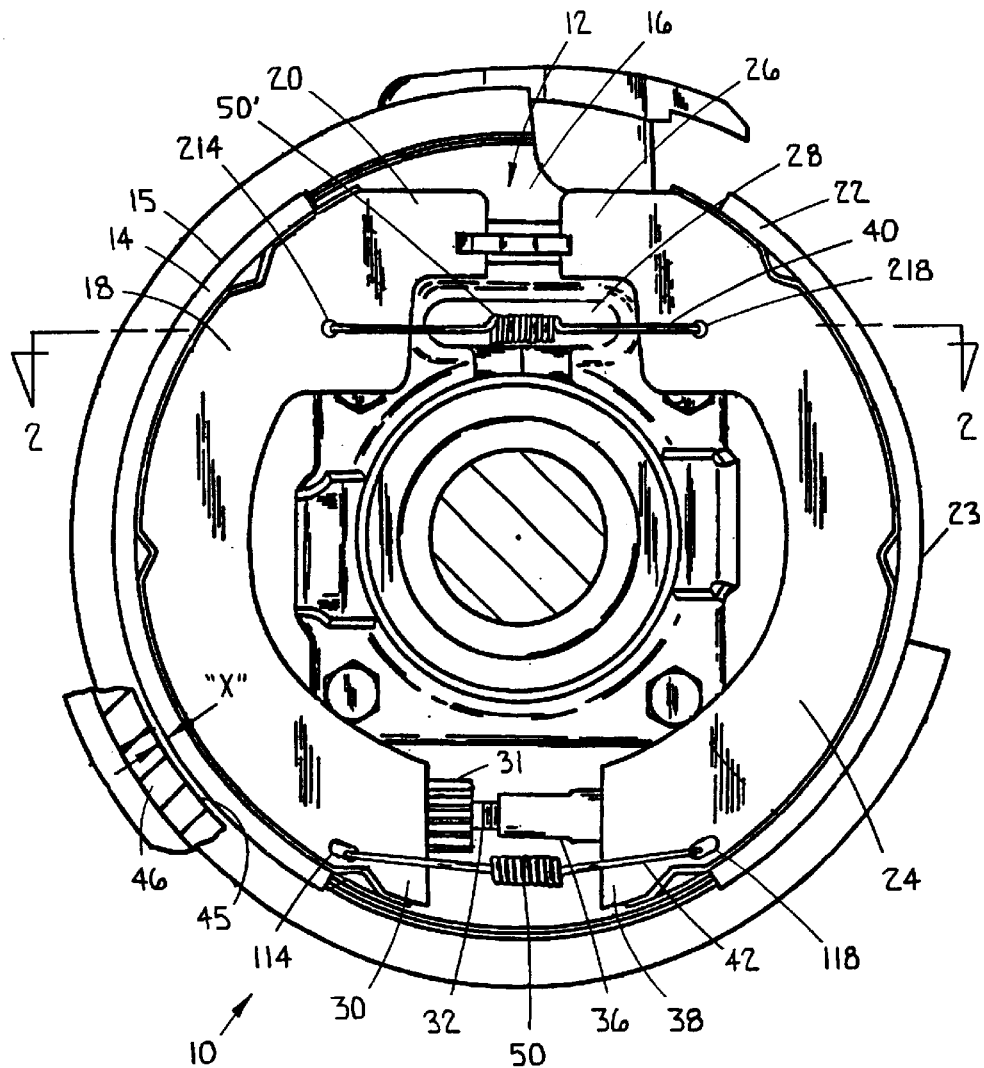
FIG. 1 is a schematic illustration of a drum brake for a vehicle having a resilient arrangement for retaining first and second brake pads on a backing plate in accordance with the present invention.

The drum brake 10 shown in FIG. 1 is designed to be used in a vehicle that includes an input member 12 for providing a force to actuate the drum brake 10 and effect a brake application. The drum brake 10 is of a general type such as disclosed in U.S. Pat. No. 4,502,574 wherein a first brake shoe 14 and a second brake shoe 22 are mounted on a backing plate 16 that is fixed to a housing of the vehicle. The first brake shoe 14 has a web 18 with a first engagement end 20 that is located in a guide slot on a projection of an anchor 28 on the backing plate 16 and a second engagement end 30 that is connected to a first end of an adjuster assembly 32 of an extendable strut 36. The second brake shoe 22 also has a web 24 with a first engagement end 26 located in a guide slot on projection of the anchor 28 and a second engagement end 38 that is connected to a second end of the extendable strut 36. For simplicity, the adjuster assembly 32 for disc brake 10 could be of a type that is disclosed in U.S. patent application Ser. No. 10/195,821 filed Jul. 15, 2002. The first engagement end 20 of brake shoe 14 and the first engagement end 26 of brake shoe 22 are urged toward anchor 28 and actuator 12 by a first spring 40 while the second engagement end 30 of brake shoe 14 and the second engagement end 38 of brake shoe 22 are urged toward adjuster assembly 32 by a second spring 42 to define a position of rest for the first brake shoe 14 and second brake shoe 22 in an absence of an input force being applied to input member 12. In the position of rest, a running clearance "x" exists between surface 45 on drum 46 and friction surface 15 on brake shoe 14 and friction surface 23 on brake shoe 22. To effect a brake application, an input force that is applied to input member 12 acts on the first 20 and second 26 engagement ends and after overcoming the spring force of springs 40 and 42 moves the first 14 and second 22 brake pads through the running clearance "x" and into engagement with surface 45 on drum 46 to effect a brake application. Springs 40 and 42 are identical in structure and could be interchanged. Similarly, the openings 15a, 15b and 17a,17b and surfaces 16a and 16b shown in FIG. 2 for backing plate 16 associated with spring 42 are also provide for spring 40. With respect to springs 40 and 42, the same reference numbers or when appropriate the number with may be used in this text in the description of the structural relationship with backing plate 16 for disc brake 10.

Figure 2:
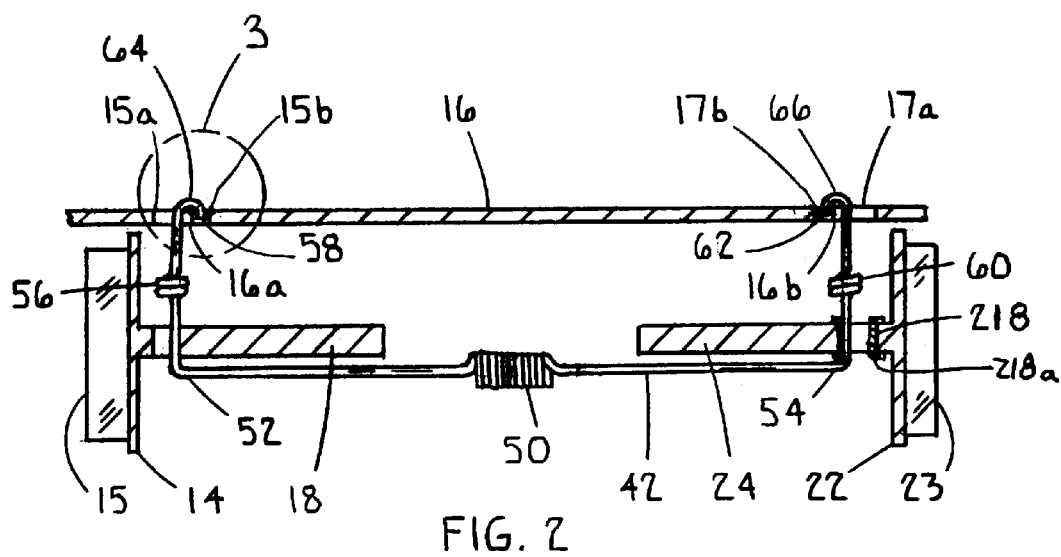
FIG. 2 is a sectional view taken along lines 2—2 of FIG. 1.
Figure 3:
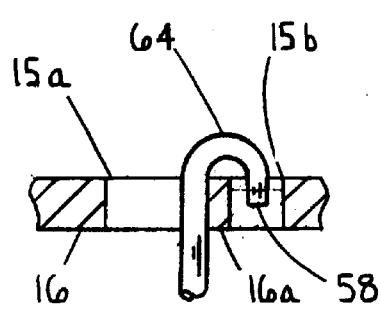
FIG. 3 is an enlarged view of circumscribed line 3 of FIG. 2 showing the connection of an end of a spring of the resilient arrangement with the backing plate.

Spring 42, as further illustrated in FIGS. 2 and 3, is defined by a continuous wire having a first helical coil 50 located between a first end of a first engagement section 52 and a first end of a second engagement section 54, a second helical coil 56 that extends from the first end of the first engagement section 52 to a second end 58 and a third helical coil 60 that extends from the first end of the second engagement section 54 to a second end 62. Spring 42 has a hook 64 on second end 58 and a hook 66 on second end 62 that are designed to respectively engage sections 16a and 16b on backing plate 16. Helical coil 50 is wound in a manner to develop a different spring force than either helical coil 56 or 60 which have a same spring force. Helical coil 50 functions as a return spring that urges the first 14 and second 22 brake shoes toward a position of rest while helical coils 56 and 60 function as hold down springs to align and retain the first 14 and second 22 brake shoes on backing plate 16.

Figure 4:
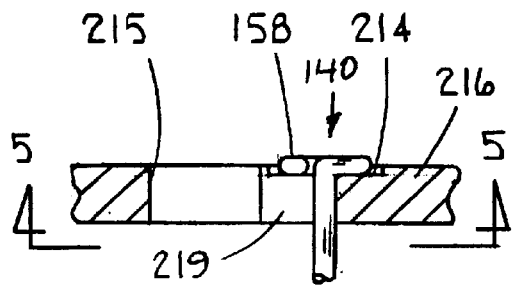
FIG. 4 is a view of an end of a secondary embodiment of a spring for the resilient arrangement of FIG. 1.
Figure 5:
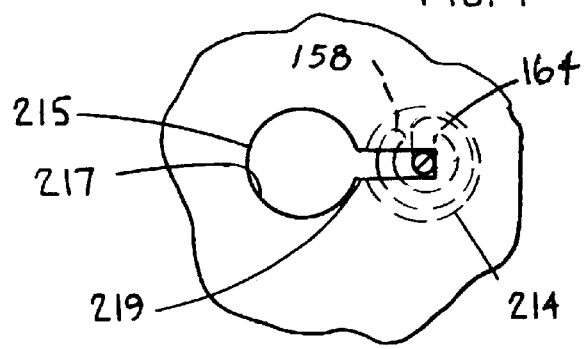
FIG. 5 is a view of an opening in the backing plate for receiving and retaining the end of the spring of FIG. 4.

A second embodiment of spring 42 is Illustrated by spring 140 as shown in FIGS. 4 and 5. Spring 140 is substantially identical with spring 42 with the exception that second ends 158 are spirals 164 rather than hooks 64,66. Spirals 164 on the second end 158 of the first and second engagement sections of spring 140 are designed to pass through keyholes 215 in backing plate 216. The second ends 158 are attached to the backing plate 216 by an attachment tool that pulls the second ends 158 through a circular opening 217 in the key hole 215 and the engagement sections are thereafter moved through a slot 219 and into and annular groove 214 to hold the second ends 158. In a desired location on the backing plate 216. A grommet 218a is illustrated in FIG. 2 with respect to opening 218 in web 24 of brake shoe 22 to provide a smooth edge on which the end of engagement section 54 of spring 42 rests and similar grommets could be provided for opening 214 and 114 in web 18 of brake shoe 12 and opening 118 in web 24 of brake shoe 22 to reduce the possibility of point wear on springs 40 or 42 after an extended period of use.

Method of Assembly

Brake shoes 14 and 22 may be attached to backing plate 16 in the following manner: A backing plate 16 is placed on a surface of a workstation; Brake shoes 14 and 22 are obtained from a source; A first engagement end 20 of brake shoe 14 is located in a first guide slot on a projection of an anchor 28 on the backing plate 16 and in alignment with actuator 12 while a second engagement end 30 is aligned with the first end of an adjuster assembly 32 of an extendable strut 36. Similarly, a first engagement end 26 of second brake shoe 22 is located in a second guide slot on the projection of the anchor 28 and in alignment with actuator 12 while the second end 38 is aligned with a second end of the extendable strut 36.

In the initial assembly, the star wheel 31 of the adjuster assembly 32 is screwed into the nut end or fixed member of the extendable strut 36 such that its length of the extendable strut 36 is a minimum;

A spring 42 is obtained from a source and its first end 58 is pushed through oval slot 114 in the first shoe 14 and its second end 62 is pushed through oval slot 118 in brake shoe 22. A tool (not shown) is brought though opening 15a in backing plate 16 and engages hook 64 to pull the first end 58 through opening 15a by expanding helical coil 56. After being pulled through opening 15a, the tool is removed from the second end 58 such that the hook 64 now engages surface 16a in backing plate 16. Thereafter, the tool is brought through opening 17a in backing plate 16 and engages 66 to pull the second end 62 through opening 17a by expanding helical coil 60. After the second end 62 is pulled through opening 17a, the tool is removed from the second end 62 such that hook 66 now engages surface 16b in backing plate 16 while the first 52 and second 54 engagement sections respectively contact web 18 adjacent oval slot 114 on the first 14 brake shoe and web 24 adjacent oval slot 118 on the second shoe 22 while the second helical coil 56 and third helical coil 60 resiliently retain the second end 30 of the first shoe 14 and the second end 38 of the second shoe 22 on backing plate 16;

Finally a spring 40 is obtained from a source and its second end 58 pushed through opening 214 in web 18 of the first brake shoe 14 and its second end 62 pushed through opening 218 in web 24 of the second brake shoe 22. A tool (not shown) is brought through an opening 15a in backing plate 16 and engages hook 64 to pull the second end 58 through opening 15a by expanding helical coil 56. After the second end 58 is pulled through opening 15a, the tool is removed from the second end 58 such that the hook 64 now engages surface 16a in backing plate 16. Thereafter, the tool is now brought through opening 17a in backing plate 16 and engages hook 66 to pull the second end 62 through opening 17a by expanding helical coil 60. After the second end 62 is pulled through opening 17a, the tool is removed from the second end 62 such that hook 66 now engages surface 16b in backing plate 16. With hook 64 and hook 66 of spring 40 respectively engaging surfaces 16a and 16b, the first engagement section 52 is in contact with that portion of web 18 surrounding opening 214 and the second engagement section 54 is in contact with that portion of web 24 surrounding opening 218 such that the first helical coil 50' urges the first end 20 on the first shoe 14 and the first end 26 on the second shoe 22 toward the anchor 28 and actuator 12 while the second helical coil 56 and third helical coil 60 resiliently retain the first brake shoe 14 and second brake shoe 22 on backing plate 16; and thereafter, star wheel 31 of the adjuster 32 is turned out from a minimum length to set the running clearance "x" for the brake shoes 14 and 22 to complete this portion of the assembly of drum brake 10.

Mode of Operation

An input force applied to actuator assembly 12 acts on the first engagement end 20 of the first brake shoe and the first end 26 of second 22 brake shoe. After overcoming the spring force of the first helical coils 50,50' of springs 40 and 42, the input force moves the first 14 and second 22 brake shoes through the running clearance x to bring friction surfaces 15 and 23 into engagement with surface 45 on drum 46 to effect a brake application. The resiliency of the second helical coils 56 and third helical coils 60 of the spring 40 and 42 allow the input force to move the first 14 and second brake shoes 22 toward the drum 46 without interfering with the development of the brake application while the engagement of the first 52 and second 54 engagement sections with webs 18 and 24 on the first 14 and second 22 brake shoes to allow the first helical coils 50,50' to return the first 14 and second 22 brake shoes to a position of rest after termination of the input force.

During the life of the vehicle it may be necessary to adjust the length of the extendable strut 36 and in this application it is accomplished by rotating star wheel 31. Since slot 114 in brake shoe 14 is oval and slot 118 in brake shoe 22 is oval, this adjustment has no effect on the alignment of the helical coil 50 with respect to the first 14 and second 22 brake shoes and as a result does not create an adverse force in effecting a brake application.

What is claimed is:

1. A drum brake for a vehicle wherein first and second brake shoes are positioned on a backing plate that is secured to the vehicle and radially aligned with a drum, said first and second brake shoes each having a first end that is aligned with an anchor post that extends from the backing plate and an actuator member and a second end that is linked to each other by an adjuster mechanism, said first end of said first brake shoe and said first end of said second brake shoe being selectively spaced apart from each other by said actuator member; resilient means connected to said first and second brake shoes for urging said first ends toward said anchor and said second ends toward said adjuster mechanism to define a rest position for said first and second brake shoes wherein a running clearance is established between friction surfaces on said first and second brake shoes and a braking surface on said drum, and an input member connected to said actuator member for transmitting a force that moves said first and second brake shoes through said running clearance such that said friction surfaces contact said engagement surface of said drum to effect a brake application, said resilient means being characterized by a first spring with a first helical coil located between a first end of a first engagement section and a first end of a second engagement section, a second helical coil that extends from said first end of said first engagement section to a second end and a third helical coil that extends from said first end of said second engagement section to a second end, said second end of said first engagement section and said second end of said second engagement section being connected to said backing plate such that said first and second engagement sections contact said first and second brake shoes and said second and third helical coils to urge said first and second brake shoes toward said backing plate while said first helical coil urges said first and second brake shoes toward said actuator and adjuster to define said rest position, said first helical coil having a different spring force than said second and third helical coils such that a greater force is required to move the first and second shoes toward said drum than is required to move the first and second shoes toward said backing plate, and second end of said first engagement section and said second end of said second engagement section each being defined by a hook that engages said backing plate to retain said first helical coil in a desired location on said backing plate.

2. The drum brake as recited in claim 1 wherein said first and second brake shoes are each characterized by oval slots through which said second ends of said first and second engagements section respectively pass, said first and second engagement surfaces respectively engaging said first and second brake shoes adjacent said oval slots in the retention of the first and second brake shoes on said backing plate.

3. The drum brake as recited in claim 1 wherein said second ends of said first and second engagement sections are each characterized by a head that passes through a key hole in said backing plate and is moved through a slot to a groove to define a desired position on the backing plate for said first spring.

4. The drum brake as recited in claim 1 wherein said resilient member is further characterized by a second spring with a first helical coil located between a first end of a first engagement section and a first end of a second engagement section, a second helical coil that extends from said first end of said engagement section to a second end and a third helical coil that extends from said first end of said second engagement section to a second end, said second end of said first engagement section and said second end of said second engagement section being connected to said backing plate such that said first and second engagement sections contact said first and second shoes and its second and third helical coils assist said first spring in urging said first and second shoes toward said backing plate while its first helical coil assist said first spring in urging said first and second brake shoes toward said actuator and adjuster to define said rest position.

5. The drum brake as recited in claim 4 wherein said first and second brake shoes are each characterized by holes through which said second end of said first engagement section and said second end of said second engagement section respectively pass, said first and second engagement sections of said second spring respectively engaging said first and second brake shoes adjacent said holes in the retention of the first and second brake shoes on said backing plate.

6. The drum brake as recited in claim 5 wherein said first and second brake shoes are characterized by grommets that are located in said holes and said oval slots to provide smooth bearing surfaces for said first and second engagement sections of said first and second springs.

7. The drum brake as recited in claim 6 wherein said first and second engagement sections of said first spring slide along said oval slots in said first and second brake shoes with a change in length of said adjuster mechanism.

* * * * *